United States Patent
Carter et al.

(10) Patent No.: US 9,473,398 B2
(45) Date of Patent: Oct. 18, 2016

(54) DEVOLVED ROUTING IN SOFTWARE-DEFINED NETWORKS

(71) Applicant: International Business Machines Corporation, Armonk, NY (US)

(72) Inventors: John Bruce Carter, Austin, TX (US); Colin Kimm Dixon, Austin, TX (US); Wesley Michael Felter, Austin, TX (US); Ankit Singla, Champaign, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 364 days.

(21) Appl. No.: 14/060,816

(22) Filed: Oct. 23, 2013

(65) Prior Publication Data

US 2015/0113124 A1 Apr. 23, 2015

(51) Int. Cl.
| | |
|---|---|
| *G06F 15/173* | (2006.01) |
| *H04L 12/715* | (2013.01) |
| *H04L 12/701* | (2013.01) |
| *G06F 12/00* | (2006.01) |
| *H04L 12/751* | (2013.01) |

(52) U.S. Cl.
CPC ............ *H04L 45/64* (2013.01); *H04L 45/00* (2013.01); *H04L 45/02* (2013.01)

(58) Field of Classification Search
CPC ..... H04L 45/00; H04L 45/02; H04L 45/028; H04L 45/70
See application file for complete search history.

(56) References Cited

U.S. PATENT DOCUMENTS

| | | |
|---|---|---|
| 7,002,958 B1 | 2/2006 | Basturk et al. |
| 7,873,043 B2 | 1/2011 | Pister et al. |
| 7,924,722 B2 | 4/2011 | Thubert et al. |
| 8,230,108 B2 | 7/2012 | Pratt, Jr. et al. |
| 2003/0107992 A1 | 6/2003 | Garcia-Luna-Aceves et al. |
| 2008/0101245 A1 | 5/2008 | Schrodi |
| 2010/0290441 A1* | 11/2010 | Stewart ................. H04W 40/12 370/338 |
| 2011/0283013 A1 | 11/2011 | Grosser et al. |
| 2013/0051250 A1 | 2/2013 | Shaffer et al. |
| 2013/0155902 A1* | 6/2013 | Feng .................. H04L 67/1031 370/255 |
| 2014/0098710 A1* | 4/2014 | Ong ....................... H04L 41/12 370/255 |
| 2014/0189074 A1* | 7/2014 | Parker .................... H04L 63/20 709/220 |
| 2014/0269331 A1* | 9/2014 | Pfeifer ................. H04L 45/124 370/238 |

OTHER PUBLICATIONS

Mogul et al; "DevoFlow: Cost-Effective Flow Management for High Performance Enterprise Networks", http://www.hpl.hp.com/personal/Puneet_Sharma/docs/papers/hotnets2010.pdf, Hotnets '10, Oct. 20-21, 2010, Monterey, CA, USA.

* cited by examiner

Primary Examiner — Zarni Maung
(74) Attorney, Agent, or Firm — Garg Law Firm, PLLC.; Rakesh Garg; William Stock

(57) ABSTRACT

A set of routing rules is receiving at a networking device in a data communication network from a controller in the data communication network implemented using the software-defined network architecture. A condition is detected at the networking device. A subset of the set of routing rules is selected in the networking device. The selecting is responsive to the condition. The subset of routing rules is applied in the networking device at a first time such that the networking device uses a first routing rule to route data traffic in the data communication network, and omits using a second routing rule received from the controller to route data traffic in the data communication network. A second subset of routing rules from the set of routing rules responsive to a second condition is applied autonomously at a second time at the networking device.

20 Claims, 8 Drawing Sheets

DEVOLVED ROUTING IN SOFTWARE-DEFINED NETWORKS

TECHNICAL FIELD

The present invention relates generally to a method, system, and computer program product for improving data communications in a data network. More particularly, the present invention relates to a method, system, and computer program product for devolved routing in software-defined networks.

BACKGROUND

A data network (network) facilitates data communication between two or more data processing systems. The data traffic from one data processing system to another passes through one or more networking devices to reach the destination.

A networking device is any device that receives data from a source and passes the data to a destination. The source and the destination can be a data processing system or another networking device. A networking device itself can be a data processing system, and conversely, a data processing system can perform the functions of a networking device.

Typically, a data packet sent from a source data processing system is handed-off through one or more networking devices before reaching a destination data processing system where the hand-off on each networking device occurs according to certain rules in the networking device. A rule for determining where a data packet goes next from a networking device in the packet's journey towards a destination data processing system is stored in the networking device.

Such a rule is called a routing rule or a next hop rule. A routing table within a networking device is one manner of storing such rules in the networking device.

SUMMARY

The illustrative embodiments provide a method, system, and computer program product for devolved routing in software-defined networks. An embodiment receives, from a controller in a data communication network implemented using the software-defined network architecture, at a networking device in the data communication network, a set of routing rules. The embodiment detects, at the networking device, a condition. The embodiment selects, in the networking device, a subset of the set of routing rules, wherein the selecting is responsive to the condition. The embodiment applies, at a first time, the subset of routing rules in the networking device such that the networking device uses a first routing rule to route data traffic in the data communication network, and omits using a second routing rule received from the controller to route data traffic in the data communication network. The embodiment applies, autonomously at a second time at the networking device, a second subset of routing rules from the set of routing rules responsive to a second condition.

Another embodiment includes a computer usable storage device including computer usable code for devolved routing in a software-defined network architecture. The embodiment further includes computer usable code for receiving, from a controller in a data communication network implemented using the software-defined network architecture, at a networking device in the data communication network, a set of routing rules. The embodiment further includes computer usable code for detecting, at the networking device, a condition. The embodiment further includes computer usable code for selecting, in the networking device, a subset of the set of routing rules, wherein the selecting is responsive to the condition. The embodiment further includes computer usable code for applying, at a first time, the subset of routing rules in the networking device such that the networking device uses a first routing rule to route data traffic in the data communication network, and omits using a second routing rule received from the controller to route data traffic in the data communication network. The embodiment further includes computer usable code for applying, autonomously at a second time at the networking device, a second subset of routing rules from the set of routing rules responsive to a second condition.

Another embodiment includes a networking device for devolved routing in a software-defined network architecture. The embodiment further includes a storage device including a storage medium, wherein the storage device stores computer usable program code. The embodiment further includes a processor, wherein the processor executes the computer usable program code. The embodiment further includes computer usable code for receiving, from a controller in a data communication network implemented using the software-defined network architecture, at a networking device in the data communication network, a set of routing rules. The embodiment further includes computer usable code for detecting, at the networking device, a condition. The embodiment further includes computer usable code for selecting, in the networking device, a subset of the set of routing rules, wherein the selecting is responsive to the condition. The embodiment further includes computer usable code for applying, at a first time, the subset of routing rules in the networking device such that the networking device uses a first routing rule to route data traffic in the data communication network, and omits using a second routing rule received from the controller to route data traffic in the data communication network. The embodiment further includes computer usable code for applying, autonomously at a second time at the networking device, a second subset of routing rules from the set of routing rules responsive to a second condition.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
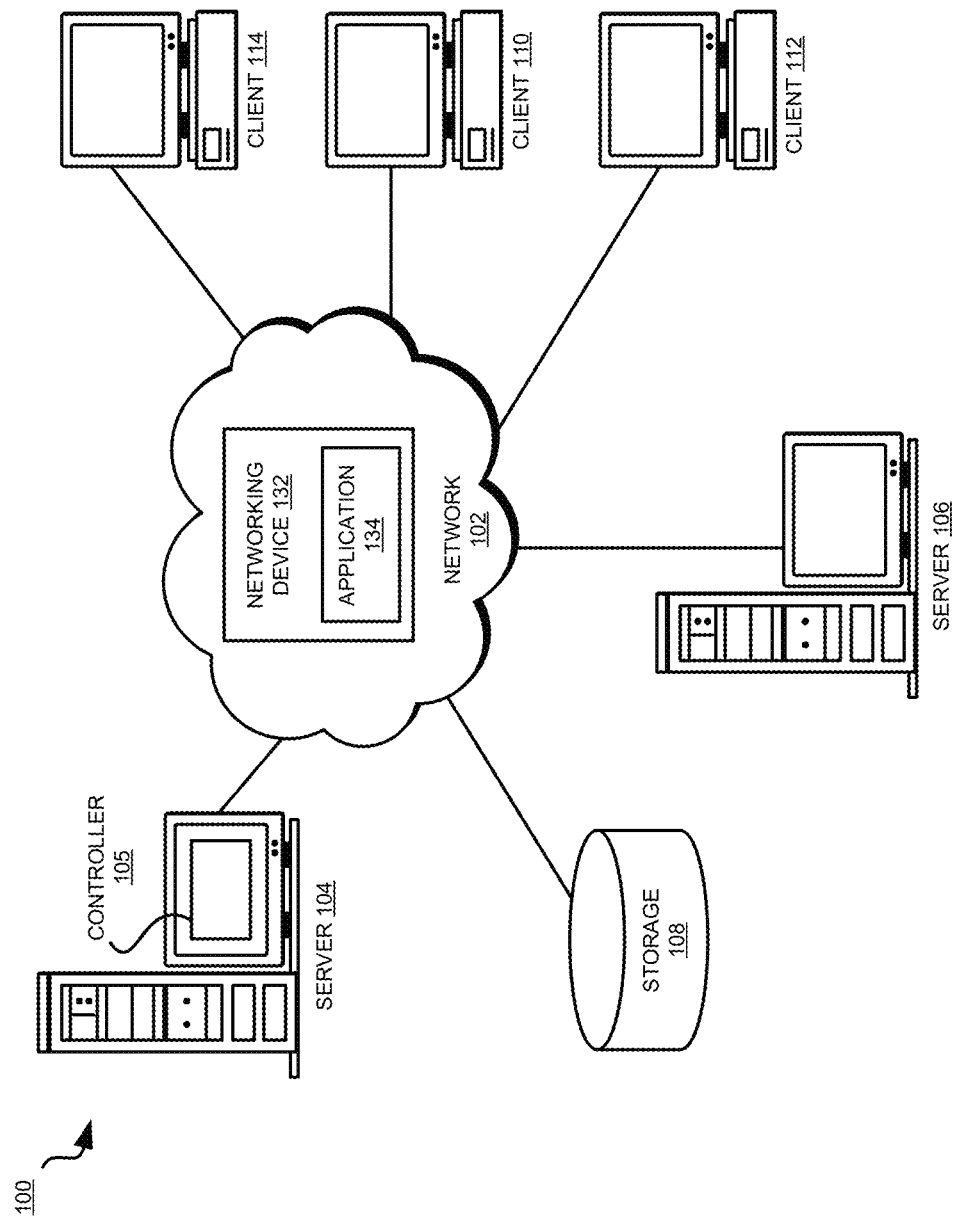
FIG. 1 depicts a block diagram of a network of data processing systems in which illustrative embodiments may be implemented.

Presently used network architectures can be classified into two types. First, the traditional type, where a networking device, such as a switch or a router, discovers a new routing path or a change in an existing routing path, and modifies the device's routing table. For example, if a new switch comes online in a network, the switch announces its presence to other networking devices that are operating in the network. Upon detecting the new switch, the switches in the network perform a distributed protocol amongst themselves to determine the new set of routings rules that need to be used by each individual switch to forward packets.

Similarly, when a route in the network or a component thereof, such as a router or a link, become unavailable, the existing switches perform a distributed protocol amongst themselves to determine the new set of routings rules that need to be used by each individual switch to forward packets, effectively removing the routes that use that component. Essentially, a traditional network architecture leaves it to the networking devices to discover the network components and determine how to route data traffic to certain destinations.

The second type of network architecture is called a software-defined network architecture. In this architecture, a controller application executes in a data processing system in the network. The controller communicates with the various networking devices operating in the network to determine the network's topology at any given time. The controller then determines the preferred routes to use to send data between two networking components or between a data processing system and a networking component in the network. The controller prescribes the routing rules necessary to implement these preferred routes to each individual networking device in a software-defined network architecture. Each networking device uses the prescribed routing rules to forward data, such as by storing all the prescribed routing rules in the device's routing table.

The illustrative embodiments recognize that the traditional architecture and the software-defined architecture each have certain shortcomings. For example, in a traditional architecture, a networking device cannot efficiently determine the topology of the entire network or determine the global state of the network, such as the states of network components that the networking device does not directly access.

The illustrative embodiments recognize that this lack of global visibility results in poor utilization of the available resources and end-to-end quality of service (QoS) management. For example, even if a new high-performance link is added in parallel to a lower-performance link in a network, a networking device is likely to maintain a route via the older lower-performance link, at least for a significant duration, until the lower-performance link is removed, or the networking device is notified of the high-performance link.

The illustrative embodiments further recognize that the software-defined architecture is limited in responsiveness to the changing network conditions. For example, a presently used controller cannot respond as quickly as a networking device to changes in local network conditions, such as link failures, device failures, link degradation, congestion, and the like.

Furthermore, the illustrative embodiments recognize that presently used controllers have to know the full capabilities of each networking device in order to be able to prescribe the routing rules that are ready for loading into the routing table at each networking device. Additionally, high-availability and high-reliability configurations may have multiple controllers executing in a network. The illustrative embodiments recognize that management of shared resources, such as buffers and tables, and conflict-avoidance becomes problematic.

The illustrative embodiments used to describe the invention generally address and solve the above-described problems and other problems related to network architectures. The illustrative embodiments provide a method, system, and computer program product for devolved routing in software-defined networks.

An acyclic route is a route that does not include any path that loops back to visit a node already visited in the route. In a network, acyclic routes ensure that a data packet does not pass through the same network device twice to reach a destination. An embodiment modifies a controller such that the controller creates an acyclical collection of routes from each source to each destination in a given network. A source can be a data processing system that originates data, or a networking device that forwards or hands-off the data to another networking device or data processing system. Likewise a destination can be a data processing system that consumes the data, or a networking device that receives the data for forwarding or handing-off to another networking device or data processing system.

The collection of acyclic routes includes routes that traverse different networking devices. From the point of view of a particular networking device, only a portion of the collection of acyclic routes includes that networking device. Different portions are similarly relevant to different networking devices.

The controller, according to an embodiment, selects a portion of the collection of acyclical routes such that a networking device is at the beginning of each route in the portion. The controller creates a set of routing rules using the portion. For example, the controller determines a next hop for each route in the portion, such as in the form of one or more next hop rules for the networking device. The controller sends the set of routing rules to the networking device. A routing rule is a definition of a path from one point in a network to next point, to wit, one hop, such as from one networking device to another networking device or data processing system.

Another embodiment modifies the operation of a networking device. A modified networking device according to an embodiment detects a condition within the networking device, the network, or both. Depending on the condition, the networking device according to an embodiment may select a subset of the set of routing rules received from the controller that has been modified according to an embodiment.

In another embodiment, the modified networking device saves the set of routing rules received from the modified controller. If or when the modified networking switch detects a change in a condition within the networking device, the network, or a combination thereof, the modified networking device, autonomously and without the participation of a modified or prior art controller, selects a different subset from the previously received set of routing rules. The modified networking device subsequently operates according to the changed subset of routing rules.

The illustrative embodiments are described with respect to certain networking devices, rules, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
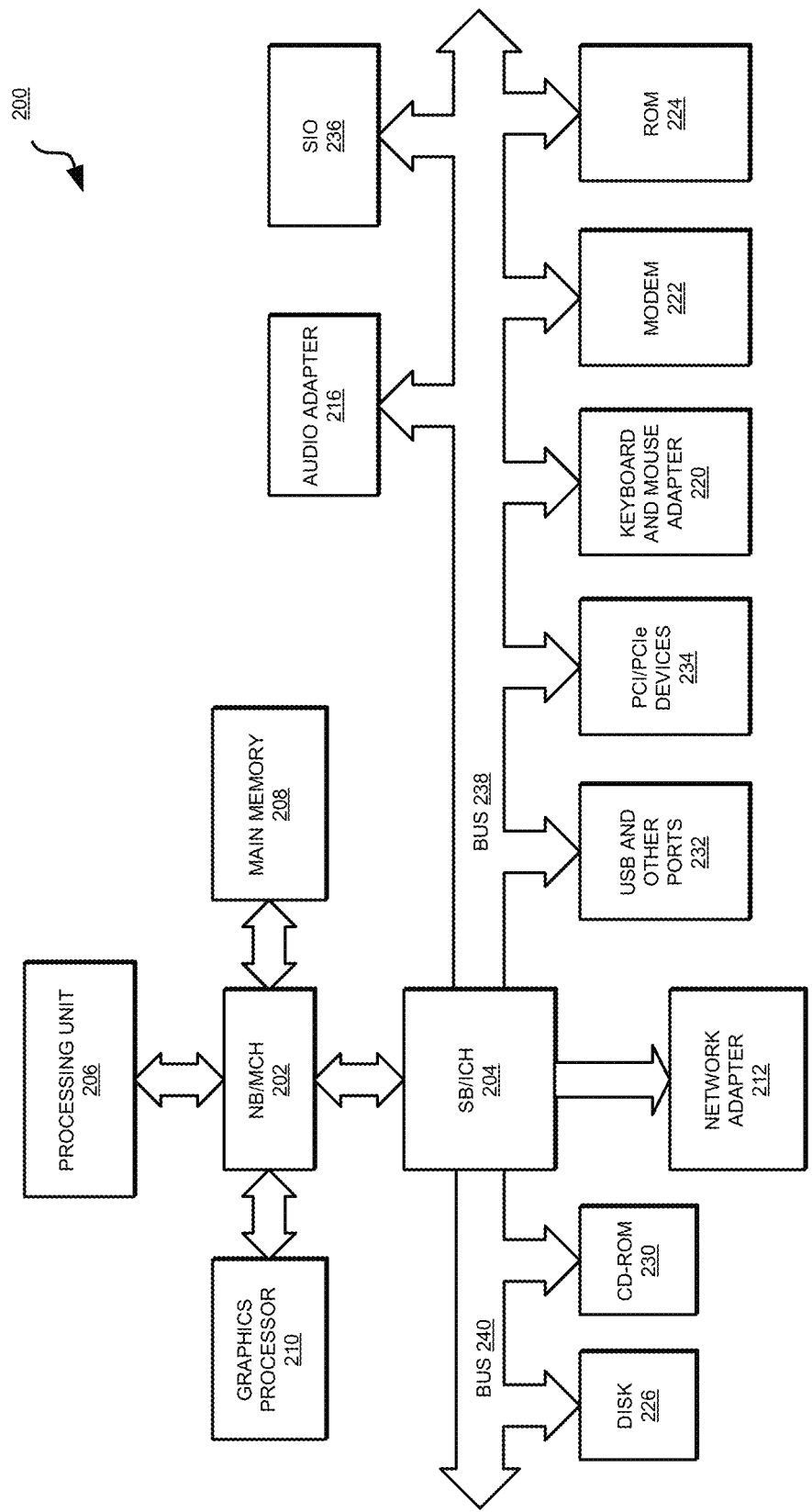
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Device 132 is an example networking device, which can include but is not limited to a networking switch, or a router, implemented in hardware, software that executes using hardware, or a combination thereof. Application 134 can take the form of a combination of hardware and software, and implements an embodiment for devolved routing in a software-defined network, as described herein. Controller 105 is prior art controller application, as used in software-defined network architectures, and as modified by an embodiment described herein. Controller 105 is implemented in software that executes using hardware such as server 104.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments. Data processing system 200 is also representative of a device, such as networking device 132 in FIG. 1 in which computer usable program code or instructions implementing the processes of the illustrative embodiments may be located for the illustrative embodiments. Data processing system 200 is also representative of an embedded, removable, or mobile computing device, such as an example implementation of networking device 132 in which computer usable program code or instructions implementing the processes of the illustrative embodiments may be located. Data processing system 200 is described as a computer only as an example, without being limited thereto. Implementations in the form of device 132 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 115 and browser 117 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a portable device, which is generally configured with flash memory to provide non-volatile memory for storing operating system files and/or data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture, such as bus 238 or bus 240.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3A:
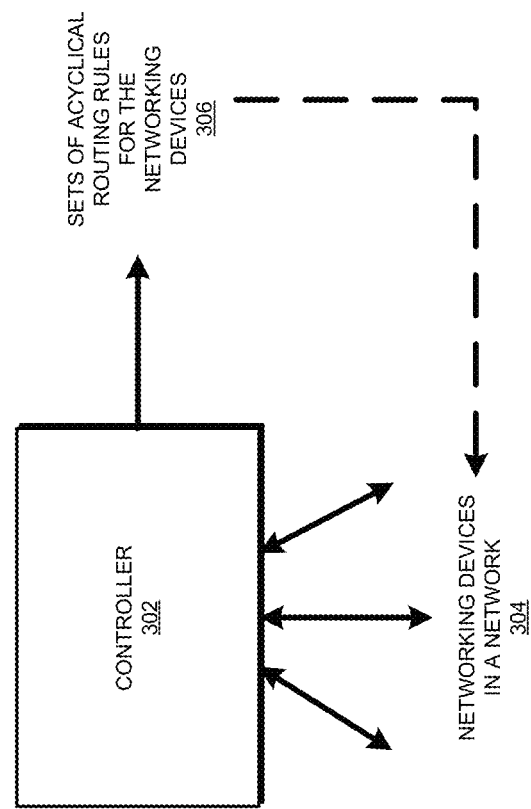
FIG. 3A depicts a block diagram of a modified controller for use in a software-defined network architecture in accordance with an illustrative embodiment.

With reference to FIG. 3A, this figure depicts a block diagram of a modified controller for use in a software-defined network architecture in accordance with an illustrative embodiment. Controller 302 can be used as controller 105 in FIG. 1.

Controller 302 communicates with one or more networking devices 304 in a given network, such as with networking device 132 in network 102 in FIG. 1. Using such communications at any given time, controller 302 determines the state of the network at the given time. The state of the network may include, but is not limited to, information such as the topology of the network, the current utilization of a link in the network, and other similar information. The communications and the state determination in controller 302 can be implemented using any known method for that purpose.

Controller 302 determines an acyclical map of routes from and to each data processing system in the network. A directional acyclical graph (DAG) is one example way of representing the acyclical map of routes. The acyclical maps can be created in any suitable form and by using any known algorithm within the scope of the illustrative embodiments.

In general, most data flowing through networking devices in a network is end-to-end, such as from a server to a client, or vice versa. Networking devices do originate some data, such as for coordinating the network operation amongst the various networking devices. A route can be broken down into pieces—each piece connecting two elements in the network—either a data processing system to a networking device, or a networking device to another networking device. Even when a networking device is not the origin of a route that passes through the networking device, the networking device can be regarded as the origin of a piece of that route where the piece of the route begins at the networking device.

Controller 302 selects one portion of the acyclical map for each networking device in networking devices 304 in the network. The portion corresponding to a networking device includes those routes in the acyclical graph that have that networking device as the origin of the route. A route may translate into more than one routing rules. Some portions may remain unchanged from an earlier iteration, and may already have routing rules, obviating the need to construct new routing rules for those portions. Accordingly, controller 302 constructs one or more routing rules for all or some routes in all or some selected portions.

For example, in one embodiment, even though controller 302 may find a route from device A to device B in networking devices 304, an instruction from a user, a specification in a system, a condition in a device or network, or an event observed at controller 302 may cause controller 302 to omit that route from the construction of the routing rules. Furthermore, in another embodiment, a type of a device, a condition at the device, an instruction from a user, or a specification in a system may prevent controller 302 from constructing routing rules for the device. A specialized networking device and a legacy networking device are some non-exhaustive examples of devices for which creating the routing rules may be omitted.

Operating in this manner, controller 302 outputs one or more sets of next hop routing rules 306 to a one or more networking devices 304. A set of acyclic routing rules in sets 306 corresponds to one networking device in networking devices 304.

Figure 3B:
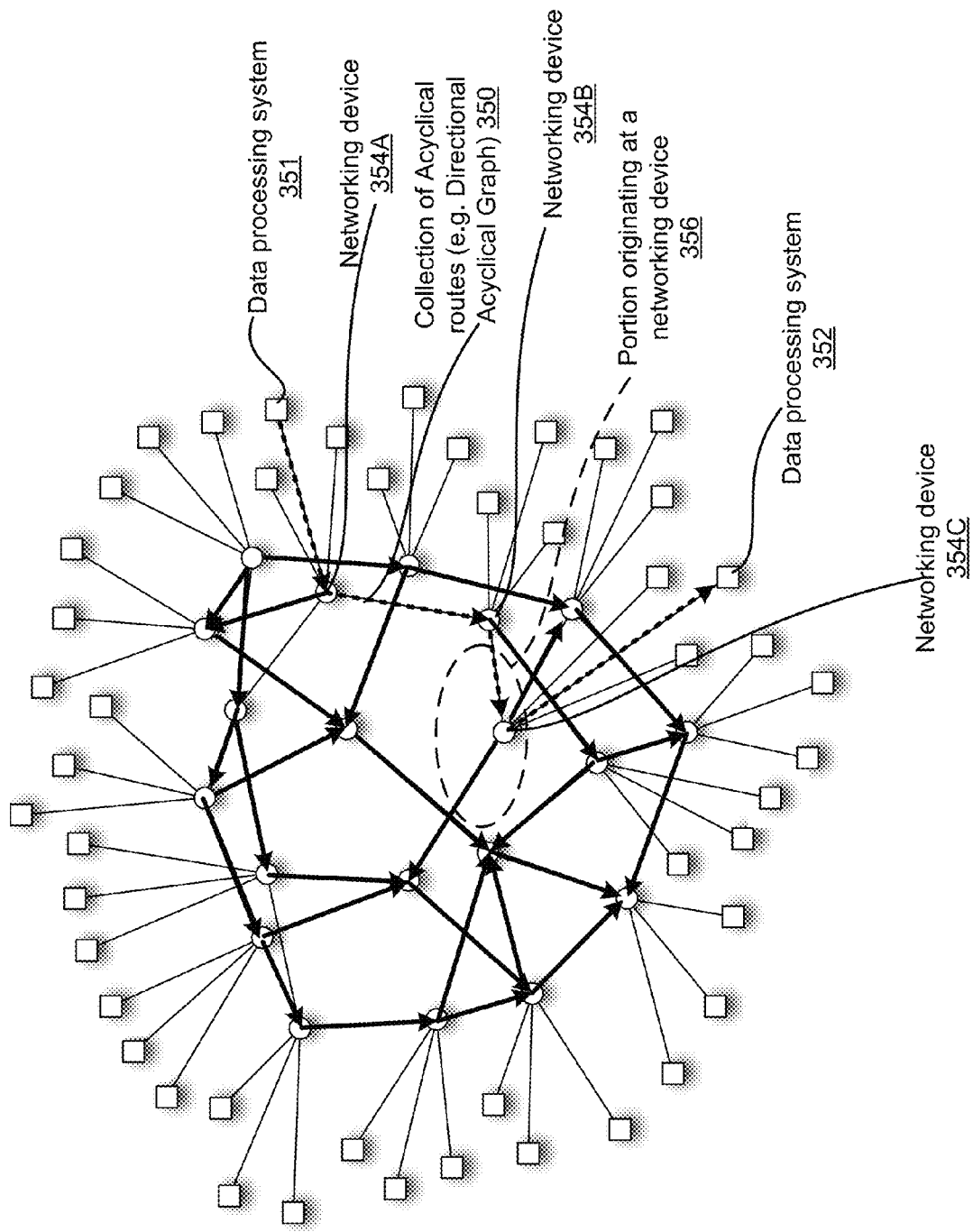
FIG. 3B depicts an example graph of acyclical routes in accordance with an illustrative embodiment.

With reference to FIG. 3B, this figure depicts an example graph of acyclical routes in accordance with an illustrative embodiment. Collection 350 is a collection of acyclical routes from one point in the depicted network to another. For example, a route in collection 350 originates from data processing system 351 and connects data processing system 351 to data processing system 352, passing through networking devices 354A, 354B, and 354C. Portion 356 of collection 350 is a portion that includes pieces of routes where those pieces originate from networking device 354.

Figure 4:
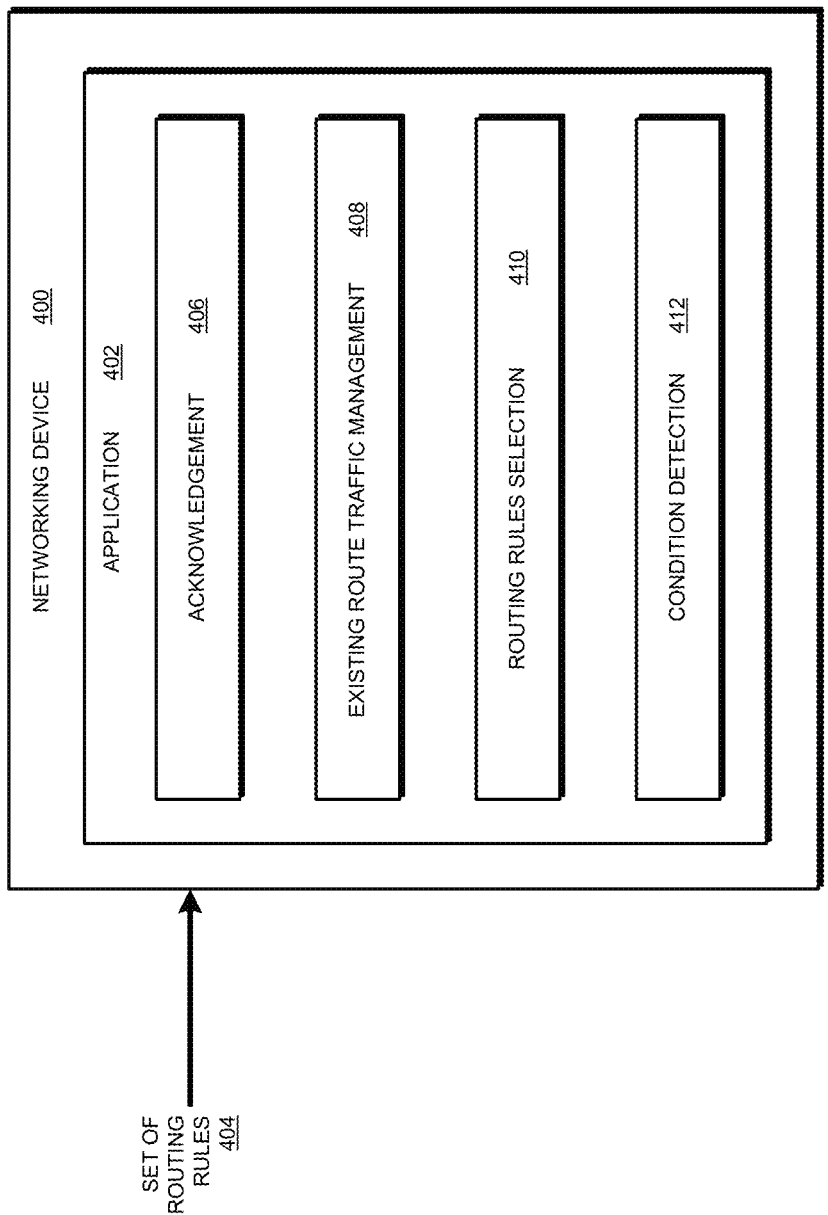
FIG. 4 depicts a block diagram of a modified networking device in accordance with an illustrative embodiment.

With reference to FIG. 4, this figure depicts a block diagram of a modified networking device in accordance with an illustrative embodiment. Networking device 400 can be implemented as networking device 132 in FIG. 1. Application 402 can be implemented as application 134 in FIG. 1.

Networking device 400 receives set of routing rules 404, such as one of sets 306 from controller 302 in FIG. 3A. Application 402 includes components 406, 408, 410, and 412. Component 406, under certain circumstances, acknowledges receipt of set 404. In one embodiment, component 406 acknowledges the receipt of set 404 routing rules each time set 404 is received at networking device 400 with a positive or a negative acknowledgement depending on the circumstances. In another embodiment, component 406 acknowledges some receipts of set 404 but not all, depending on the circumstances. In one embodiment, component 406 collaborates with component 408, which manages route traffic for routes loaded in networking device 400 from previously received set 404.

For example, currently received set 404 may omit a routing rule that was included in a previous version of set 404 received at networking device 400 at an earlier time. Before component 406 can acknowledge presently received set 404, component 408 determines whether the removed route has pending data traffic, such as packets already queued for that route. Under such an example circumstance, existing route traffic management component 408 instructs component 406 to delay sending the acknowledgement until component 408 has sent all packets for the removed route to that route, and confirms to component 406 that the route queue of the removed route has been drained.

An embodiment configures a controller, such as controller 302 in FIG. 3A, to send a set of routing rules to a networking device, such as networking device 400, and optionally wait for an acknowledgement from that device before sending another set of routing rules to another device. Waiting for acknowledgements is purposed for, and has the effect of, avoiding creating a cyclical route or other conflicts in the network when a route is removed from the routing rules for a device.

For example, when one route is removed from a set of routing rules of one device, the device may continue to send queued traffic on the currently installed route for a period of time and briefly delay implementing the removal, which may leave undesired routes operational in the network. As another example, device A may receive set A of routing rules before device B receives set B of routing rules. Device A may delay implementing set A. Device B may implement set B ahead of device A implementing set A, which may introduce conflicting, circular, or error-prone routes in the network that were not recommended by the controller in either set A or set B.

In one embodiment, if the controller determines that any of the new routing rules cannot create a cyclical route when merged with the prior installed routing rules, the controller can omit the acknowledgement step described earlier.

The example circumstances are not exhaustive of other circumstances that may warrant an acknowledgement, a delayed acknowledgement, or a negative acknowledgement. The example purpose of the acknowledgement, or the example effect thereof on a controller, is also non-exhaustive and non-limiting on the illustrative embodiments. Those of ordinary skill in the art will be able to conceive other circumstances and reasons for using component 406 in a similar manner and for a similar purpose, and the same are contemplated within the scope of the illustrative embodiments.

Component 410 selects a subset of routing rules from set 404 to implement. For example, in one embodiment, component 410 caches set 404, and selects a subset of set 404 of routing rules to process and load in a routing table or equivalent structure in networking device 400. Component 410 uses conditions detected by condition detection component 412 to determine which routing rules to implement from set 404 into networking device 400.

For example, assume that set 404 includes a routing rule that recommends device 400 (device A) place the traffic destined for device B on port X of device A. Component 412 of device A reports that a link associated with port X is congested and should not be used. Component 412 can similarly report other issues, problems, or troubles with a component of networking device 400, a link in the network, or another device in the network (Collectively referred to as condition). Component 412 can produce such reports specifically for a recommended routing rule in set 404, such as upon receiving set 404, or can cache periodic or even-based detections of conditions for eventual use with a recommended routing rule in this manner.

Figure 5:
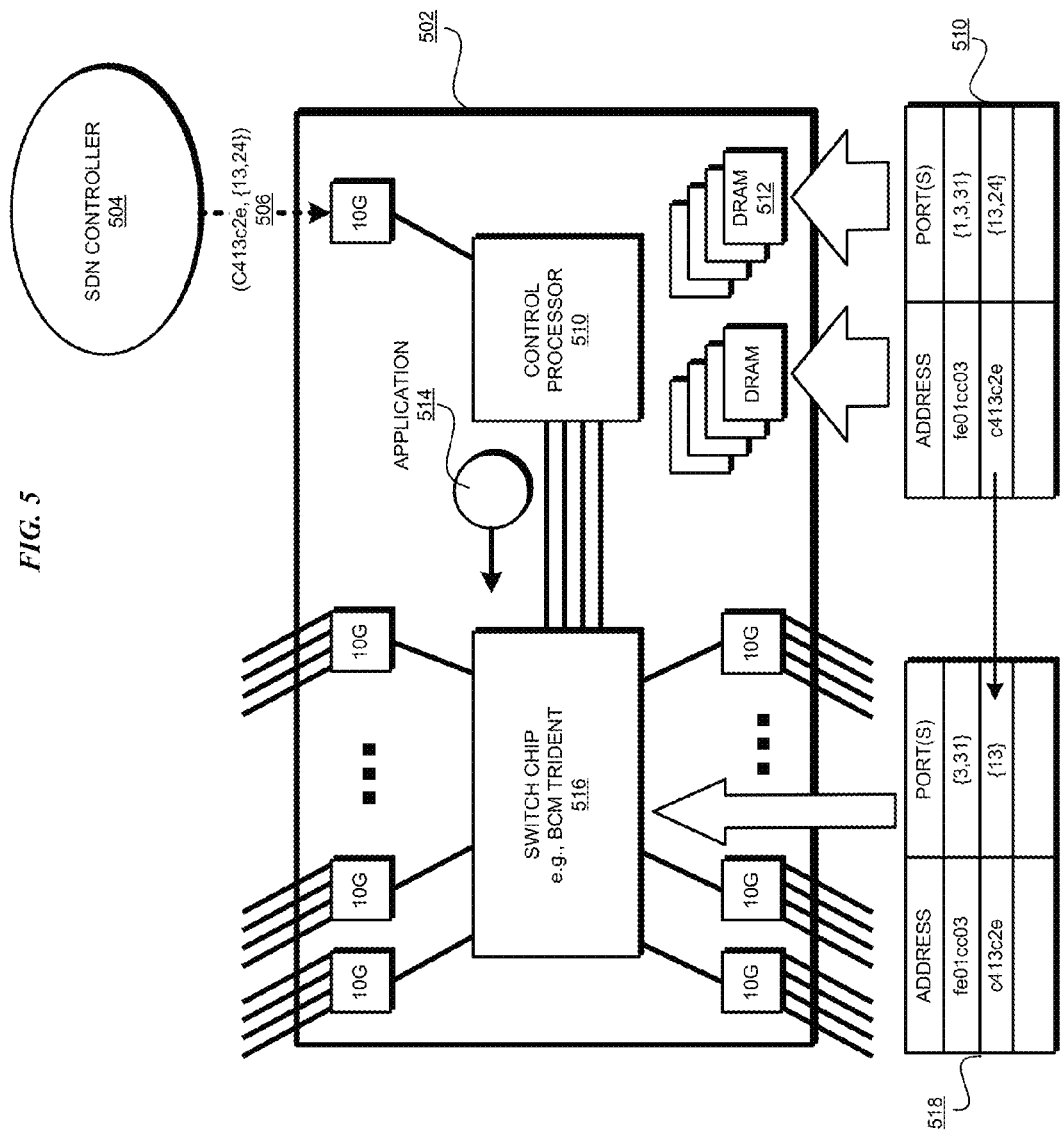
FIG. 5 depicts a block diagram of an example modified networking device for devolved routing in software-defined networks in accordance with an illustrative embodiment.

With reference to FIG. 5, this figure depicts a block diagram of an example modified networking device for devolved routing in software-defined networks in accordance with an illustrative embodiment. Device 502 can be implemented as networking device 400 in FIG. 4. SDN controller 504 is a software-defined network can be implemented using controller 302 in FIG. 3A.

In the depicted example, controller 504 sends routing rule 506 as a part of recommended set of routing rules, such as set 404 in FIG. 4, to device 502. Processor 508 saves routing rule 506 in example form 510 in cache 512 and caches other routing rules received from controller 504 in a similar manner.

Application 514 is an embodiment of application 402 in FIG. 4. Processor 510, using application 514, selects a subset of the cached routing rules. Processor 510, using application 514, implements the selected routing rules, such as in a routing table, for switch chip 516 to use.

As an illustrative example of the operation, suppose that controller 504 sends routing rule 506, which recommends that switch 502 place the traffic for address c413c2e on port 13, port 24, or both. Cached entry 510 stores this recommended routing rule. Processor 510, using application 514, determines that port 24 should not be used due to some condition existing in device 502 or the network. Accordingly, processor 510 using application 514, implements routing rule 518, which is a subset of routing rule 510 in that according to implemented routing rule 518, the traffic for address c413c2e will be placed only on port 13 and not on the other recommended port, port 24.

Figure 6:
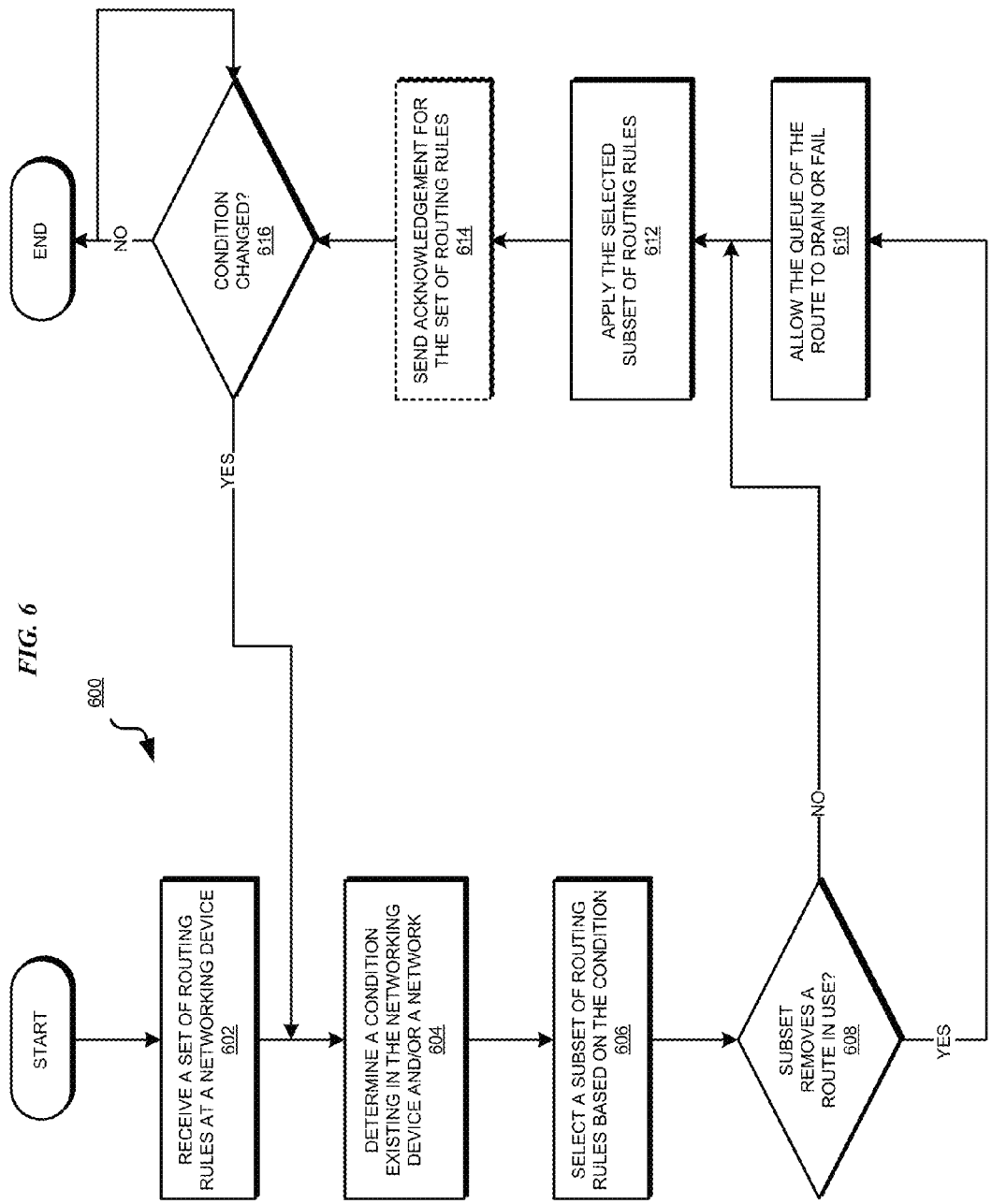
FIG. 6 depicts a flowchart of an example process for devolved routing in software-defined networks in accordance with an illustrative embodiment.

With reference to FIG. 6, this figure depicts a flowchart of an example process for devolved routing in software-defined networks in accordance with an illustrative embodiment. Process 600 can be implemented in application 402 in FIG. 4 or application 516 in FIG. 5.

The application begins process 600 by receiving a set of routing rules at a network device (block 602). The application determines a condition existing in the networking device, the network, or a combination thereof (block 604).

The application selects a subset of the routing rules based on the condition detected in block 604 (block 606). In one embodiment, the application determines to implement the entire set of routing rule received in block 602, such as when no condition adverse to any of the routing rule is present in the device or the network.

The application determines whether the subset removes a route currently in use in the networking device (block 608). If a route is to be removed ("Yes" path of block 608), the application allows a queue associates with that route to drain, or the transmission on that route to fail (block 610). Thereafter, or when no existing route is removed by implementing the subset ("No" path of block 608), the application applies the selected subset of routing rules, such as by updating a routing table or an equivalent structure in the networking device (block 612). Optionally, the application may send an acknowledgement for the set of routing rules (block 614).

The application determines whether a condition in the networking device or the network has changed in order to change the subset of routing rules that are presently implemented (block 616). If a condition has changed ("Yes" path of block 616) to warrant changing the routing rules, the application returns to block 604 to select a different subset of routing rules from the set received in block 602. If the condition has not changed ("No" path of block 616), the application ends process 600 thereafter. In one embodiment, the application continues monitoring for condition change at block 616, or remains ready for receiving new set of routing rules from the controller at block 602.

Figure 7:
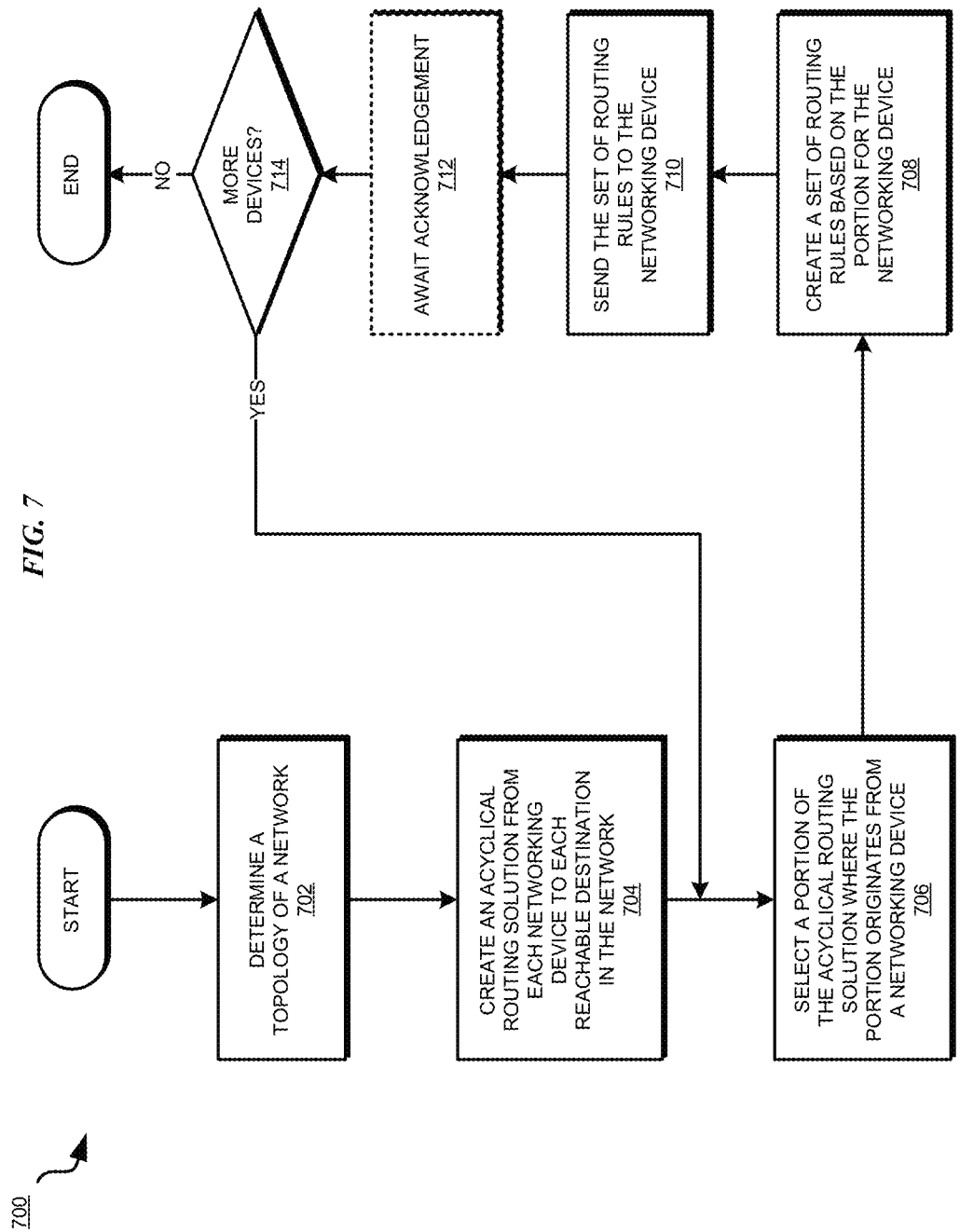
FIG. 7 depicts a flowchart of an example process for recommending routing rules to a networking device in a software-defined network architecture in accordance with an illustrative embodiment.

With reference to FIG. 7, this figure depicts a flowchart of an example process for recommending routing rules to a networking device in a software-defined network architecture in accordance with an illustrative embodiment. Process 700 can be implemented in a controller, such as controller 302 in FIG. 3A or controller 504 in FIG. 5.

The controller begins process 700 by determining a current topology of a network (block 702). The controller creates an acyclical routing solution for each networking device to each reachable destination in the network (block 704). A reachable destination is another networking device or a data processing system in the network.

The controller selects a portion of the acyclical routing solution where the portion originates from a networking device, such as portion 356 in FIG. 3B, (block 706). Based on the portion, the controller creates a set of next hop routing rules for the networking device (block 708). The controller sends the set of routing rules to the networking device (block 710).

The controller awaits an acknowledgement from the networking device before proceeding to block 714 (block 712). In one embodiment (not shown), the controller proceeds to block 714 without waiting for the acknowledgement. In another embodiment, the controller retries the send operation of block 710 if no acknowledgement is received or a negative acknowledgement is received (not shown).

The controller determines whether more devices exist in the network, which should receive routing rules based on the current topology (block 714). If more devices remain ("Yes" path of block 714,) the controller returns to block 706 to select another portion for another networking device. If no more devices should receive routing rules ("No" path of block 714), the controller ends process 700 thereafter. In one embodiment, the controller returns to block 702 and monitors the network topology changes.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for devolved routing in software-defined networks. An embodiment devolves or delegates a portion of the routing decisions to the networking device even in a software-defined network architecture. An embodiment provides a hybrid architecture for devolved routing in software-defined networks.

In the prior art the controller makes the routing decisions and a networking device simply implements those decisions. In contrast, in an embodiment, the controller makes some informed routing recommendations according to the present global state of the network. A networking device in an embodiment retains the autonomy to accept or reject some of those recommendations. Thus, an embodiment overcomes the shortcomings observed in implementing only the traditional architecture or only the software-defined architecture.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for devolved routing in a software-defined network architecture, the method comprising:
receiving, from a controller in a data communication network implemented using the software-defined network architecture, at a networking device in the data communication network, a set of routing rules;
acknowledging receiving the set of routing rules from the controller, wherein the controller waits for the acknowledging when a route in the set of routes has a possibility of creating a cyclical route in the data communication network, and the acknowledging causes the controller to send a second set of routing rules to a second networking device without creating the cyclical route in the data communication network;
detecting, at the networking device, a condition;
selecting, in the networking device, a subset of the set of routing rules, wherein the selecting is responsive to the condition;
applying, at a first time, the subset of routing rules in the networking device such that the networking device uses a first routing rule to route data traffic in the data communication network, and omits using a second routing rule received from the controller to route data traffic in the data communication network; and
applying, autonomously at a second time at the networking device, a second subset of routing rules from the set of routing rules responsive to a second condition.

2. The method of claim 1, further comprising:
detecting, at the networking device, a change in the condition, the change in the condition forming the second condition; and
selecting, autonomously in the networking device, the second subset of a set of routing rules, wherein the selecting the second subset is responsive to the second condition.

3. The method of claim 1, further comprising:
determining whether the subset causes an existing route already in use by the networking device to be removed from future use;
delaying applying the subset until a queue associated with the existing route is empty; and
acknowledging a receipt of the set of routing rules to the controller after the queue is empty.

4. The method of claim 1, wherein the set of routing rules is a recommendation from the controller, further comprising:
rejecting, by the networking device, a third subset of routing rules in the set of routing rules.

5. The method of claim 1, wherein the condition is a problem in the data communication network, wherein the problem prevents the networking device to route data traffic in the data communication network using a routing rule in the set of routing rules, and wherein the selecting omits the routing rule from the subset of routing rules.

6. The method of claim 1, wherein a routing rule in the set of routing rules specifies a routing path for a data packet from the networking device to a destination device in the data communication network.

7. The method of claim 6, wherein the destination device is another networking device operating in the data communication network.

8. The method of claim 1, wherein each routing rule in the set of routing rules is a next hop corresponding to a route that begins at the networking device and ends at a device adjacent to the networking device in the data communication network.

9. The computer usable program product of claim 1, wherein each routing rule in the set of routing rules is a next hop corresponding to a route that begins at the networking device and ends at a device adjacent to the networking device in the data communication network.

10. A computer usable program product comprising a computer usable storage device including computer usable code for devolved routing in a software-defined network architecture, the computer usable code comprising:
computer usable code for receiving, from a controller in a data communication network implemented using the software-defined network architecture, at a networking device in the data communication network, a set of routing rules;
computer usable code for acknowledging receiving the set of routing rules from the controller, wherein the controller waits for the acknowledging when a route in the set of routes has a possibility of creating a cyclical route in the data communication network, and the acknowledging causes the controller to send a second set of routing rules to a second networking device without creating the cyclical route in the data communication network;
computer usable code for detecting, at the networking device, a condition;
computer usable code for selecting, in the networking device, a subset of the set of routing rules, wherein the selecting is responsive to the condition;
computer usable code for applying, at a first time, the subset of routing rules in the networking device such that the networking device uses a first routing rule to route data traffic in the data communication network, and omits using a second routing rule received from the controller to route data traffic in the data communication network; and
computer usable code for applying, autonomously at a second time at the networking device, a second subset of routing rules from the set of routing rules responsive to a second condition.

11. The computer usable program product of claim 10, further comprising:
computer usable code for detecting, at the networking device, a change in the condition, the change in the condition forming the second condition; and
computer usable code for selecting, autonomously in the networking device, the second subset of a set of routing rules, wherein the selecting the second subset is responsive to the second condition.

12. The computer usable program product of claim 10, further comprising:
computer usable code for determining whether the subset causes an existing route already in use by the networking device to be removed from future use;
computer usable code for delaying applying the subset until a queue associated with the existing route is empty; and
computer usable code for acknowledging a receipt of the set of routing rules to the controller after the queue is empty.

13. The computer usable program product of claim 10, wherein the set of routing rules is a recommendation from the controller, further comprising:

computer usable code for rejecting, by the networking device, a third subset of routing rules in the set of routing rules.

14. The computer usable program product of claim 10, wherein the condition is a problem in the data communication network, wherein the problem prevents the networking device to route data traffic in the data communication network using a routing rule in the set of routing rules, and wherein the selecting omits the routing rule from the subset of routing rules.

15. The computer usable program product of claim 10, wherein a routing rule in the set of routing rules specifies a routing path for a data packet from the networking device to a destination device in the data communication network.

16. The computer usable program product of claim 15, wherein the destination device is another networking device operating in the data communication network.

17. The computer usable program product of claim 10, wherein the computer usable code is stored in a computer readable storage device in a data processing system, and wherein the computer usable code is transferred over a network from a remote data processing system.

18. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

19. An networking device for devolved routing in a software-defined network architecture, the networking device comprising:
   a storage device, wherein the storage device stores computer usable program code; and
   a processor, wherein the processor executes the computer usable program code, and wherein the computer usable program code comprises:
      computer usable code for receiving, from a controller in a data communication network implemented using the software-defined network architecture, at a networking device in the data communication network, a set of routing rules;
      computer usable code for acknowledging receiving the set of routing rules from the controller, wherein the controller waits for the acknowledging when a route in the set of routes has a possibility of creating a cyclical route in the data communication network, and the acknowledging causes the controller to send a second set of routing rules to a second networking device without creating the cyclical route in the data communication network;
      computer usable code for detecting, at the networking device, a condition;
      computer usable code for selecting, in the networking device, a subset of the set of routing rules, wherein the selecting is responsive to the condition;
      computer usable code for applying, at a first time, the subset of routing rules in the networking device such that the networking device uses a first routing rule to route data traffic in the data communication network, and omits using a second routing rule received from the controller to route data traffic in the data communication network; and
      computer usable code for applying, autonomously at a second time at the networking device, a second subset of routing rules from the set of routing rules responsive to a second condition.

20. The networking device of claim 19, further comprising:
   computer usable code for detecting, at the networking device, a change in the condition, the change in the condition forming the second condition; and
   computer usable code for selecting, autonomously in the networking device, the second subset of a set of routing rules, wherein the selecting the second subset is responsive to the second condition.

* * * * *